United States Patent [19]

Sugihara et al.

[11] Patent Number: 6,035,247
[45] Date of Patent: Mar. 7, 2000

[54] DISTRIBUTION PANEL SWITCH GEAR AND MONITORING AND CONTROL SYSTEM HAVING DISTRIBUTION PANEL SWITCH GEAR

[75] Inventors: Masashi Sugihara, Tokai-mura; Masayuki Fukai, Hitachi; Akio Ito, Hitachi; Katsuhito Shimizu, Hitachi, all of Japan

[73] Assignee: Hitachi, Ltd., Tokyo, Japan

[21] Appl. No.: 08/969,300

[22] Filed: Nov. 13, 1997

[30] Foreign Application Priority Data

Nov. 26, 1996 [JP] Japan ................................. 8-314383

[51] Int. Cl.⁷ .................................................. G05B 15/00
[52] U.S. Cl. ................................................. 700/292; 700/2
[58] Field of Search ............................ 364/528.27, 131; 700/2, 292

[56] References Cited

U.S. PATENT DOCUMENTS 4,787,041  11/1988  Yount .................................. 364/424.03
5,270,917  12/1993  Kimura ................................... 364/187

OTHER PUBLICATIONS

Thermal and Atomic Power Generation 1993, Jul., "An Instrument Control and an Automation IV; a Control and an Automation of a Stream Power Plant", pp. 829–854.

*Primary Examiner*—William Grant
*Assistant Examiner*—Bethew B. Jennings, III
*Attorney, Agent, or Firm*—Kenyon & Kenyon

[57] ABSTRACT

A communication module of a controller for outputting a command relating to an operation and a monitor for auxiliaries to be operated and a communication module of a switch gear for generating information relating to a protection and an interlock for the auxiliaries to be operated are connected through a serial transmission cable wires. Each of the switch gears is connected each other through a serial transmission cable wires. By controlling a CPU in the switch gear, an activation of the auxiliaries to be protected which are connected to a power circuit is commanded and then the protection operation and the interlock operation for the auxiliaries to be operated are carried out. A small scale of the apparatus can be attained and the wiring cables can be lessened.

7 Claims, 4 Drawing Sheets

DISTRIBUTION PANEL SWITCH GEAR AND MONITORING AND CONTROL SYSTEM HAVING DISTRIBUTION PANEL SWITCH GEAR

BACKGROUND OF THE INVENTION

1. Field of the Invention

The present invention relates to a distribution panel switch gear and a monitoring and control system having a distribution panel switch gear and in particularly to a distribution panel switch gear and a monitoring and control system having a distribution panel switch gear suitable for controlling an operation and a monitor of various kinds of process apparatuses used in a hydraulic power plant, a thermal power plant, and an atomic power plant.

2. Description of the Prior Art

In an atomic power plant, a system for operating various kinds of process apparatuses has constructed in accordance with a command which is outputted from a main control panel. For example, there is an article title of Thermal and Atomic Power Generation 1993, July number, "an instrument control and an automation IV; a control and an automation of a stream power plant".

In this article, a main control panel and a unit computer are arranged in a central control room, an auxiliaries sequence controller is connected to the unit computer through a net work. Further, an auxiliaries interlock relay panel is connected to the auxiliaries sequence controller and a distribution panel switch gear (a switch gear) is connected to this auxiliaries interlock relay panel.

The auxiliaries sequence controller comprises a CPU for executing a sequential control and in addition to the above CPU a digital output device which output a command for operating an activation and a stop to an auxiliaries. The auxiliaries interlock relay panel comprises a process device protecting circuit and a process device interlocking circuit and these circuits are constituted according to relays.

Further, the above stated distribution panel switch gear comprises various kinds of process devices and plural switches which are connected to, for example, a motorized valve and a pump etc.. The switch performs an opening and closing operation in response to a signal from the auxiliaries interlock relay panel and supplies the power to a designated process device.

Namely, when the relay in the auxiliaries interlock relay panel is operated in response to an activation signal etc. from the auxiliaries sequence controller, a designated switch in the plural switches, which are disposed in the distribution panel switch gear, is closed and then the power is supplied to the motorized valve etc..

In the above stated prior art, the relay of the auxiliaries interlock relay panel and the switches of the distribution panel switch gear are connected independently through cables and further the signals for the activating command and the stopping command of the pump and the signals for the valve opening commands and the valve closing command of the motorized valve are transmitted according to the cable wires.

As a result, with the above stated reasons, since it is necessary to wire the cable wires which correspond to a number of commands from the process relays as the auxiliaries to be operated, there is a problem in which a large scale size apparatus is needed.

SUMMARY OF THE INVENTION (Objects of the Invention)

An object of the present invention is to provide a distribution panel switch gear and a monitoring and control system having a distribution panel switch gear wherein a simplicity of an apparatus constitution can be obtained.

(Statements of the Invention)

A distribution panel switch gear according to the present invention comprises plural controlling means provided for corresponding respectively to plural auxiliaries to be operated and for controlling a drive of each of the plural auxiliaries to be operated in response to a control command, plural condition inputting means for inputting respectively a signal in response to a condition of each of the plural auxiliaries to be operated, a monitor information generating means for generating monitor information which includes at least one side information in information relating to a protection and an interlock of each of the plural auxiliaries to be operated in accordance with an input of each of the condition inputting information, and a control command outputting means for outputting a control command to a designated controlling means of the plural controlling means in accordance with monitor information which is generated in the monitor information generating means.

To construct the above stated distribution panel switch gear, it is desirable to construct with a redundant form the monitor information generating means and the control command outputting means. As a result, the reliability of the distribution panel switch gear can be improved and further the safety of the distribution panel switch gear can be secured.

A monitoring and control system having a distribution panel switch gear according to the present invention comprises an operation and monitor command outputting means for outputting a command relating to an operation and a monitor of plural auxiliaries to be operated, plural controlling means provided for corresponding respectively to the plural auxiliaries to be operated and for controlling a drive of each of the plural auxiliaries to be operated in response to a control command, plural condition inputting means for inputting respectively a signal in response to a condition of each of the plural auxiliaries to be operated, a monitor information generating means for generating monitor information which includes at least one side information in an inputted information by carrying out a transfer of information between the operation and monitor command outputting means and information relating to a protection and an interlock of each of the plural auxiliaries to be operated in accordance with an input of each of the condition inputting information, and a control command outputting means for outputting a control command to a designated controlling means of the plural controlling means in accordance with monitor information which is generated in the monitor information generating means, the operation and monitor command outputting means and the distribution panel switch gear having the monitor information generating means are connected through a serial transmission system.

To construct the above stated monitoring and control system, in addition to the above stated elements, the apparatus further comprises plural auxiliary condition inputting means for outputting respectively a signal in response to a condition of each of the plural auxiliaries to be operated, and an auxiliary operation and monitor command outputting means for outputting a command relating to an operation and a monitor of each of plural auxiliaries to be operated in accordance with an input of each of the plural auxiliary operation condition inputting means, it is possible to connect the auxiliary operation and monitor information inputting means and the distribution panel switch gear having the monitor information generating means in accordance with a serial transmission system.

Further, to construct each system, it is possible to add following elements.

(1) It is possible to construct with the redundant form of the serial transmission system for carrying out the transfer of the information between the operation and monitor command outputting means and the monitor information generating means in the distribution panel switch gear.

In other words, to improve the reliability for the system, it is possible to construct with the redundant form between the communication module which is mounted on the operation and monitor command outputting means and the communication module which is mounted on the distribution panel switch gear.

(2) In place of the command from the operation and monitor command outputting means, it is possible to construct a maintenance information inputting means for inputting to the monitor information generating means information relating to a maintenance.

(3) In place of the command from the operation and monitor command outputting means, it is possible to construct an operation and monitor information inputting means for inputting to the monitor information generating means information relating to an operation and a monitor about each auxiliaries to be operated.

According to the above stated various means, since the control relating to the protection and the interlock of the plural auxiliaries to be operated is carried out in accordance with a single distribution panel switch gear, the simplification in the apparatus construction can be attained.

Further, since the operation and monitor command outputting means and the monitor information generating means are connected through the serial transmission system, when in accordance with the command outputted from the operation and monitor command outputting means the control relating to the protection and the interlock of plural auxiliaries to be operated is carried out, the transfer of the command can be carried out in accordance with the serial transmission system.

As a result, it is unnecessary to correspond to the auxiliaries to be operated and the cable wires one by one, therefore the simplification in the apparatus construction can be attained.

As stated in the above, according to the present invention, since the operation control and the monitor control relating to the plural auxiliaries to be operated is carried out in accordance with a single distribution panel, the simplification in the apparatus construction can be attained.

Further, since the operation and monitor command outputting and the monitor information generating means are connected in accordance with the serial transmission system, it is unnecessary to provide a transmission system in response to the number of commands, as a result the simplification of the apparatus construction and the compact scale of the system can be obtained.

DETAILED DESCRIPTION OF THE PREFERRED EMBODIMENTS

Hereinafter, one embodiment of a distribution panel switch gear and a monitoring and control system having a distribution panel switch gear according to the present invention will be explained referring to drawings.

Figure 1:
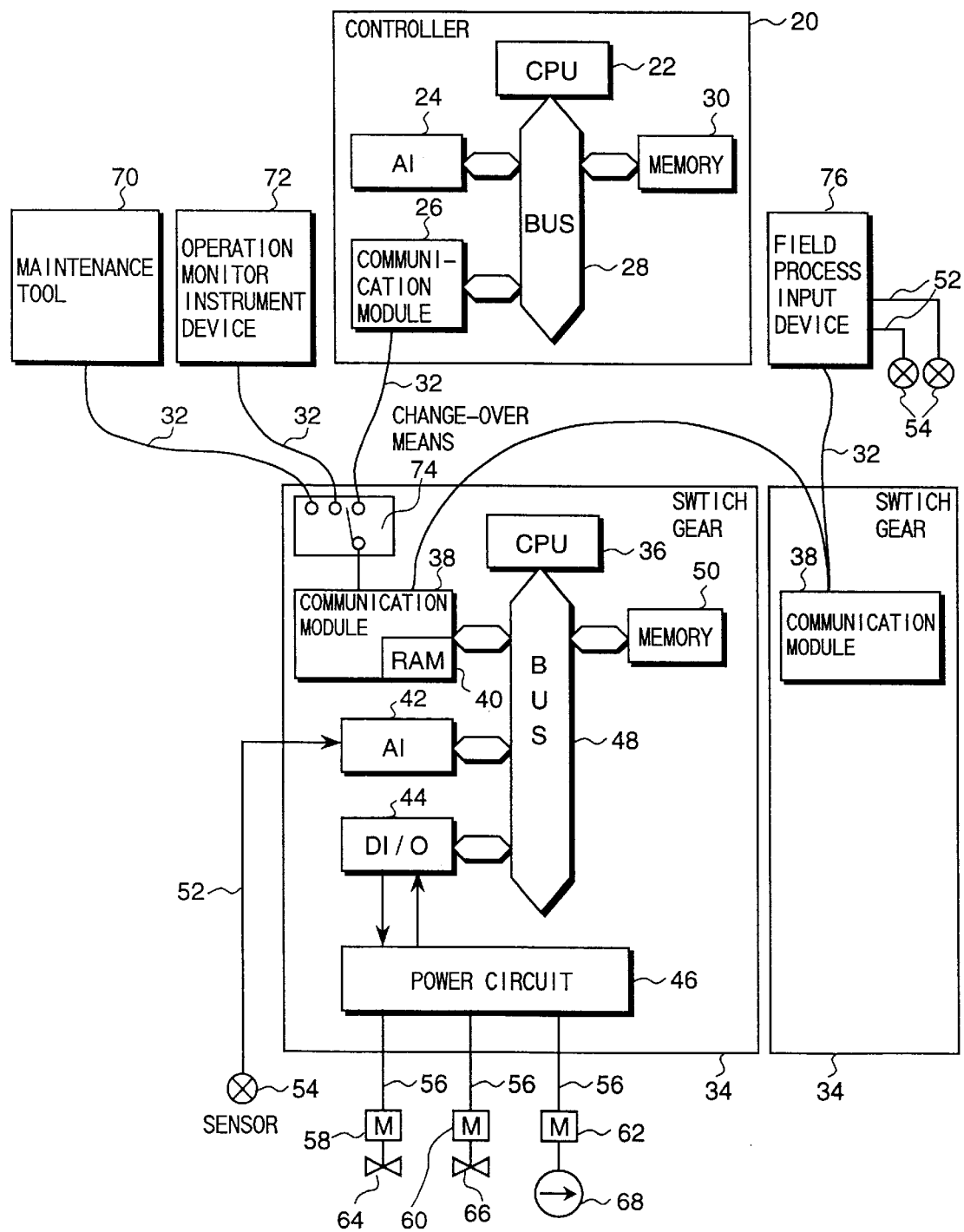
FIG. 1 is an essential block construction view showing a first embodiment of a monitoring and control system having a distribution panel switch gear according to the present invention.
Figure 2:
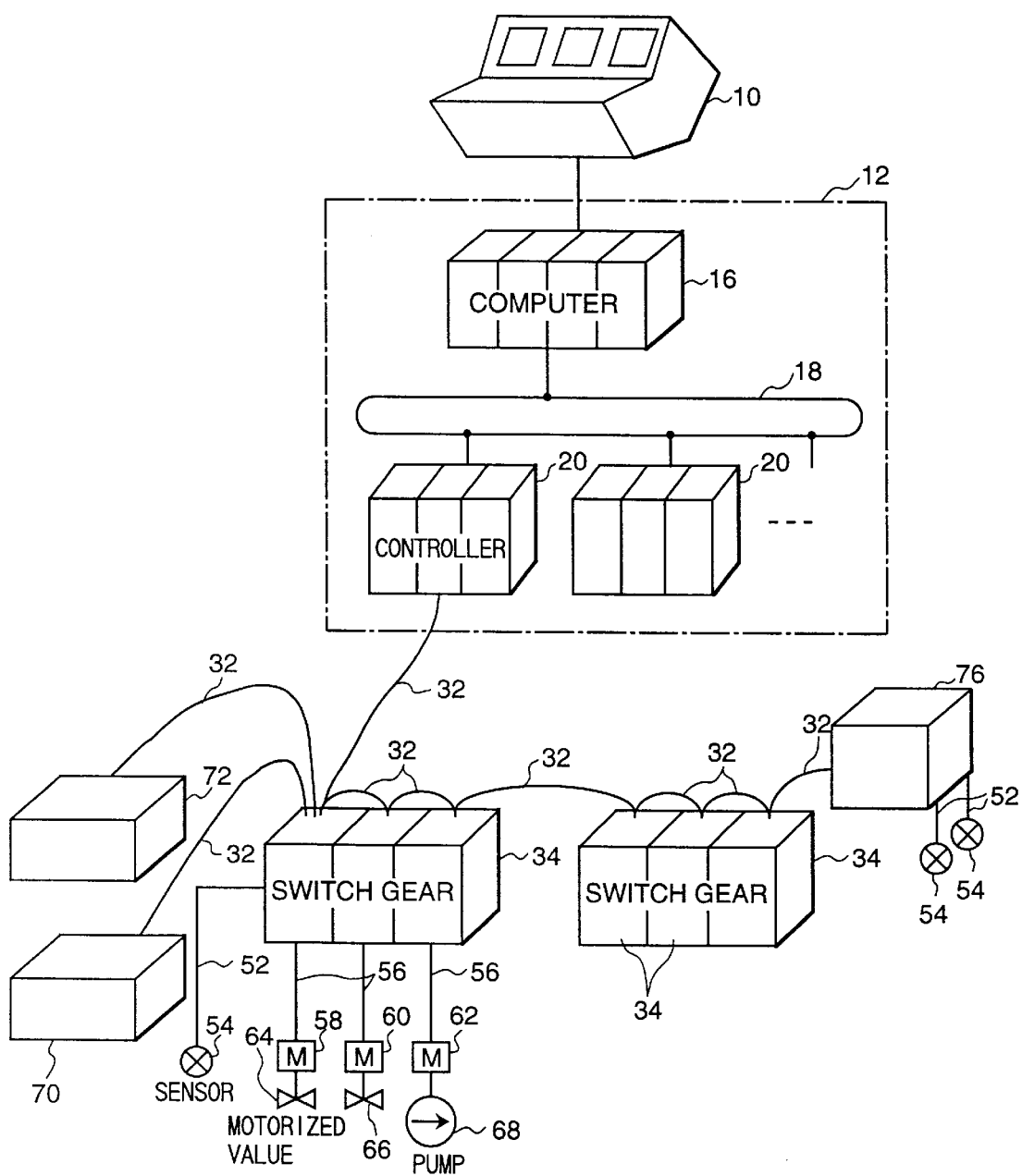
FIG. 2 is a whole construction view showing the monitoring and control system according to the present invention.

FIG. 1 is an essential block construction view showing one embodiment of a monitoring and control system having a distribution panel switch gear according to the present invention and FIG. 2 is a whole construction view showing the monitoring and control system.

In FIG. 2, a computer 16, a net work 18 and plural controllers 20 are installed in a central controller room 12. The computer 16 is connected to each of the plural controllers 20 through the net work 18 and also is connected to a main control panel 10.

The main control panel 10 input commands which are accompanied with the monitor and the operation of an operator and the inputted commands are transferred to the computer 16. The computer 16 generates various kinds of control commands which are accompanied with the operation and the monitor under a basis of the inputted command and the generated command are transferred to each of the plural controllers 20 through the net work 18.

The controller 20, as shown in FIG. 1, is an operation and monitor command outputting means for outputting commands relating to plural operation and monitor commands and this controller 20 is constructed to be comprised of a CPU 22, an analog input unit (circuit) (AI) 24, a communication module 26, a bus 28, and a memory 30.

As shown in FIG. 1 and FIG. 2, the controller 20 is connected to plural switch gears 34 through a serial transmission cable (a serial transmission system). Namely, the controller 20 carries out the command transfer (command giving and command receiving) between the computer 16 through the net work 18. The controller 20 carries out also the transfer (giving and receiving) of the commands between the switch gear 34 through the serial transferring cable 32. The serial transfer is a signal redundant form transmission and carries out the transmission of the digital signal.

Each switch gear 34 working a role as the distribution panel switch gear is constructed to be comprised of a CPU 36, a communication module 38, a RAM (a random access memory) 40, an analog input unit (circuit) (AI) 42, a digital input/output unit (circuit) (DI/O) 44, a power circuit 46, a bus 48, and a memory 50.

The analog input unit (AI) 42 is connected to a sensor 54 through a process cable 52 and the power circuit 46 is connected to motors 58, 60 and 62 through process cable wires 56. The communication module 38 comprises a sending and receiving unit and according to the commands from a CPU 36 the communication module 38 carries out the transfer of the command which is accompanied with the operation and the monitor between the communication module 26 through the serial transmission cable wire 32.

The communication module 38 carries out also the transfer of the command and the information between the communication module 38 of the other switch gears 34. The command which is inputted to the communication module 38 and the information under the processing according to CPU 36 is stored once in RAM 40.

The analog input unit (AI) 42 is constructed as a condition inputting means which input the signal relating to a condition of the auxiliaries to be operated from the sensor 54. After the inputted signal has converted to a digital signal and the converted signal is transmitted to CPU 36 through the bus 48.

In the memory 50 the information relating to the protection and the interlock about the auxiliaries to be operated of the motors 58, 60 and 62 etc., for example, the information relating to a setting value relating to the protection and the interlock etc.

CPU 36 is constructed to be comprised of a monitor information generating means which generates the information relating to the protection and the interlock of the auxiliaries to be operated according to the information stored in RAM 40 and the memory 50 and according to the information inputted from the analog input unit (AI) 42.

Further, CPU 36 generates a control command under a basis of the generated monitor information and the generated control command is outputted to the power circuit 46 through the digital input/output unit (DI/O) 44. The digital input/output unit 44 (DI/O) is constructed to be comprised of a condition inputting means for inputting a condition signal relating to the auxiliaries to be protected and also is constructed to a control command outputting means for outputting the control command to the power circuit 46.

The power circuit 46 is arranged on the switch gear 34 and is constructed to be comprised of switching elements connected to the motors 58, 60 and 62 and each of the switching elements is connected to the power supply. When the switching element presents to an "on" state in response to the control command from the digital input/output unit (DI/O) 44, the electric power from the power supply is supplied to the motors 58, 60 and 62.

Namely, the power circuit 46 is constructed to as a control means for controlling the motors 58, 60 and 62 which are connected to the two motorized valves 64 and 66 and a pump 68.

In other words, as the switch gear 34, since the apparatus has the condition inputting means and the monitor information generating means, it is possible to generate the control command by the switch gear 34 itself. Further, in the switch gear 34, since the digital signal is used, it is possible to transmit the signal between the switch gear 34 and the controller 20 and further it is possible to make a functional burden between the switch gear 34 and the controller 20 as the monitoring and control system.

Next, an operation of the communication module 38 of the above stated embodiment of the monitoring and control system having the distribution panel switch gear according to the present invention will be explained.

First of all, when from the controller 20 the activating and the stopping command relating to the auxiliaries to be operated (auxiliaries to be operates 64, 66, 68) is transmitted through the serial transmission cable wire 32, then the communication module 38 receives the above command. After that the received command is stored in RAM 40 and the contents of RAM 40 are outputted to CPU 36 through the bus 48.

The communication module 38 used in this apparatus comprises of a LSI etc. and, for example, it is preferable to employ a reversal double transmission system in which as the signals [1010] and [0101] are transmitted and then the signal is checked.

In the above stated embodiment of the monitoring and control system according to the present invention, when CPU 22 output the command, which is accompanied with the operation and the monitor, working as a role of the command generating unit for generating the command, which is accompanied with the operation and the monitor, this command is serially transmitted to each of the switch gears 34 through the communication modules 26 and the serial transmission cable wires 32.

As a result, it is unnecessary to connect each of the controllers 20 and each of the switch gears 34 using the independent cable wires and therefore the simplification in the apparatus construction can be attained.

Further, in the command given and received between the communication module 26 and the communication module 38, the information excluding the interlock, for example, the information of the manual operation command from the operator, is used in main. However, the information which requires the emergency operation, such as the information relating to the protection and the interlock about the auxiliaries to be operated, is generated in CPU 36.

Accordingly, the communication speed for giving and receiving the command between the communication module 26 and the communication module 38 is comparatively slow against the execution speed and therefore there is no obstruction even in a case where the communication speed is about 100 ms and several seconds.

Further, not shown in figure, a signal generating means is provided in the respective controller 20. Such a signal generating means is a condition judgment signal generating means which generates a condition judgment signal showing whether or not an abnormality causes in the respective controller 20. As a result, it is possible to employ a construction where the signal generating means is connected to the communication module 38 through a transmission system which is different from the above stated serial transmission cable 32.

Figure 3:
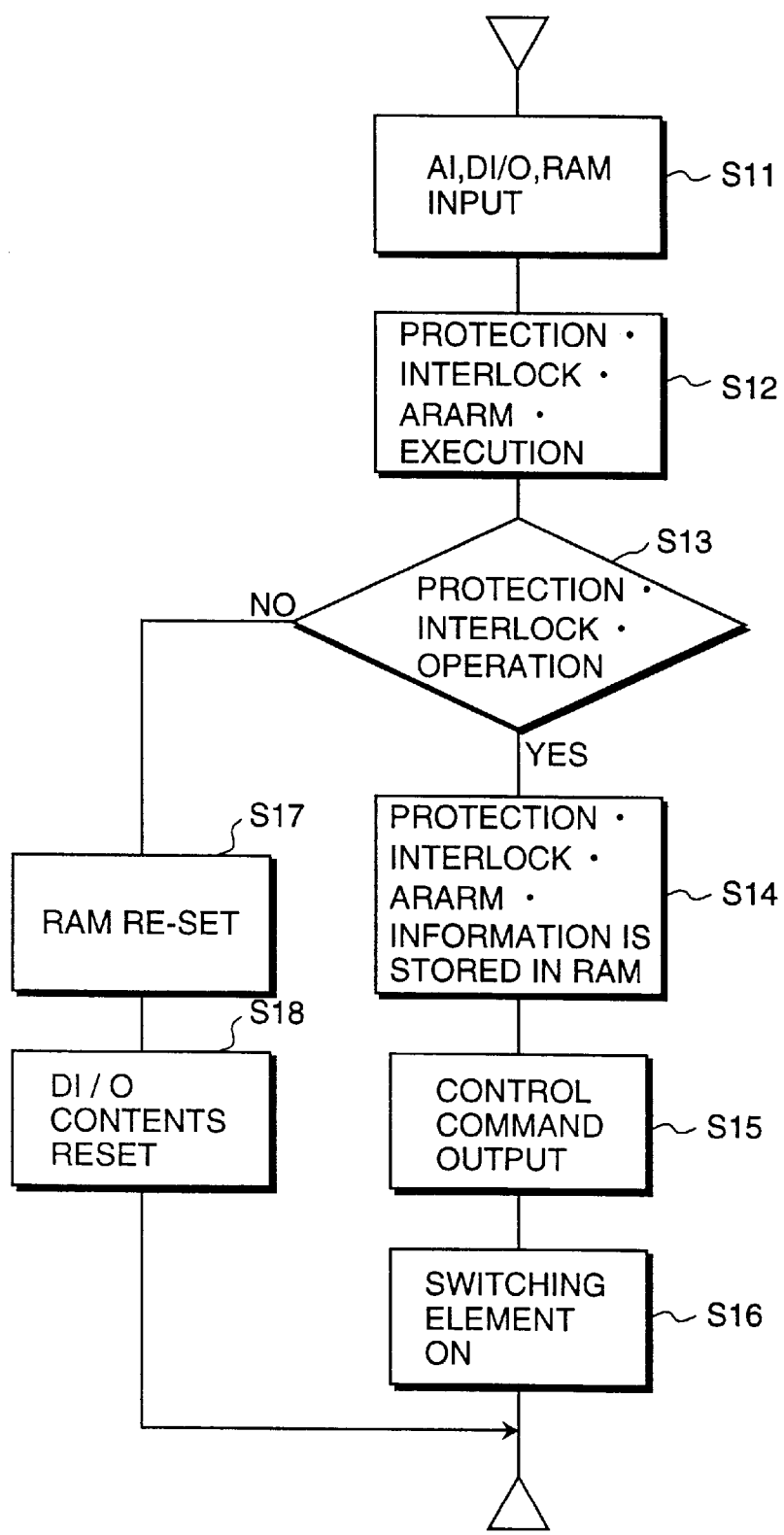
FIG. 3 is a flow chart view for explaining an operation of a switch gear according to the present invention.

Next, an operation of the switch gear 34 with CPU 36 as a main element will be explained referring to a flow chart shown in FIG. 3.

First of all, CPU 36 input the contents of RAM 40 and also input the information from the analog input unit (AI) 42 and the information from the digital input/output unit (DI/O) 44 (a step S11). Under a basis of the inputted information CPU 34 is carried out the protection execution, the interlock execution and the alarm execution etc. and the information relating to the protection and the monitor is generated (a step S12).

After that the generated information is compared with the setting values relating to the protection and the interlock, the above setting values, which are stored in the memory 50 in advance, and the judgment about whether or not the protection operation and the interlock operation are necessary (a step S13).

In a case where when the protection operation and the interlock operation are necessary, the information relating to the protection operation and the interlock operation and/or the alarm are stored in RAM 40 (a step S14) and also the control demand in respond to the above stated information is outputted to the power circuit 46 through the digital input/output unit (DI/O) 44 (a step S15).

Accordingly, a designated switching element of the power circuit 46 presents to an "on" state, thereby the protection operation and the interlock operation to the auxiliaries to be operated is carried out (a step S16).

On the other hand, in a case where when the protection operation and the interlock operation are unnecessary, in RAM 40 and the digital input/output unit (DI/O) 44, the related portions relating to the protection operation and the interlock operation are performed to re-set (a step S17 and a step S18), then the processing in this routine is finished.

Since the operation relating to the protection and the interlock requires the emergency operation, it is necessary to carry out, for example, at 1 ms–100 ms, as the execution speed. In the interior portion of the switch gear 34, the processing is performed with the above stated execution speed.

With the above reasons, when the abnormality etc. of the auxiliaries to be operated is detected according to the sensor 54, the auxiliaries to be operated are protected immediately. In other words, when the operation relating to the protection and the interlock is performed, the control command is generated in the interior portion of the switch gear 34. Since it is possible to generate the control command to the auxiliaries to be operated without through the controller 20, the apparatus can be controlled immediately.

As stated in the above, in this embodiment according to the present invention, since the controls relating to the protection and the interlock of each of the auxiliaries to be operated is carried out in a lump using the switch gear 34, the simplification in the apparatus construction can be attained.

Namely, it is unnecessary to wire the cables corresponding to a number of the commands relating to the operations of the pump 68 and the motorized valves 64 and 66 etc., the controls to the plural auxiliaries to be operated can be carried out in a lump.

Further, the control relating to the protection indicates a control in which the malfunction in the auxiliaries to be operated can be prevented. The control relating to the interlock indicates the so-called sequential control in which the auxiliaries to be operated are operated to work together.

Further, in a case where the auxiliaries to be operated are added, it is possible to add a further switch gear 34 in response to the added auxiliaries to be operated. Further, it is possible to connect the added further switch gear 34 to the other switch gear 34 through the serial transmission cable wires 32, as a result the system construction of the apparatus can be carried out easily.

Further, it is possible to make with the redundant form the communication module 26, the serial transmission cable wires 32, the communication module 38. Also it is possible to make redundant RAM 40, CPU 36, the memory 50, the bus 48 the digital input/output unit (DI/O) 44. As a result, the reliability of the transmission etc. of the apparatus can be improved.

Further, the apparatus can install a maintenance tool 70 as a maintenance information inputting means and an operation and monitor instrument device 72 as an operation and monitor command inputting means.

The maintenance tool 70 and the operation and monitor instrument device 72 are connected to a change-over means 74 through the serial transmission cable 32 and an output of the change-over means 74 is connected to the communication module 38 through the serial transmission cable wires 32. Namely, the output of the controller 20 is connected to the communication module 38 through the change-over means 74.

In a case of the provisions of the maintenance tool 70 and the operation and monitor instrument device 72 in the apparatus, when a monitoring operator input the information relating to the addition, the alteration and the deletion of the contents of the memory 50 using the maintenance tool 70, the above stated information is inputted as the information relating to the maintenance through the communication module 38. Therefore, the maintenance relating to the memory 50 is carried out.

In this case, since a transmission path of the serial transmission cable 32 is changed over according to the change-over means 74, it is impossible to input the information from the controller 20 into the switch gear 34. Further, in a case where the maintenance information is inputted from the controller 20, it is possible to carry out the maintenance of the information of the memory 50.

Further, in accordance with the operation of the monitoring operator, it is possible to input the command relating to the operation and the monitor to the switch gear 34 from the operation and monitor instrument device 72. In this case, in a case where the operation and monitor instrument device 72 and the controller 20 are connected to the communication module 38 in accordance with the change-over means 74, it is possible to carry out the operation and the monitor with respect to one of the operation and monitor instrument device 72 and the controller 20.

On the other hand, in a case where the change-over means 74 is connected to the controller 20 and also the operation and monitor instrument device 72 is connected directly to the communication module 38, it is possible to carry out at the same time the operation and the monitor using both of the operation and monitor instrument device 72 and the controller 20.

In a case where an inputting unit for inputting the command relating to the operation and the monitor is provided on the communication module 39 and also a receiving unit for outputting the command and the information to the maintenance tool 70 and the controller 20 according to a radio wire is provided, it is possible to carry out the transfer of the command and the information between the operation and monitor instrument device 72 and the switch gear 34.

There is a case in which the change-over means 74 is provided on the switch gear 34 and further the change-over means 74 is connected to the maintenance tool 70 and the operation and monitor instrument device 72. In this case, before the installation of the controller 20 and the cable connection working completion for the serial transmission cable 32 between the controller 20 and the switch gear 34, it is possible to carry out the maintenance of the memory and an operation testing of the auxiliaries to be operated. As a result, it is possible to shorten the installation construction and the testing process.

Figure 4:
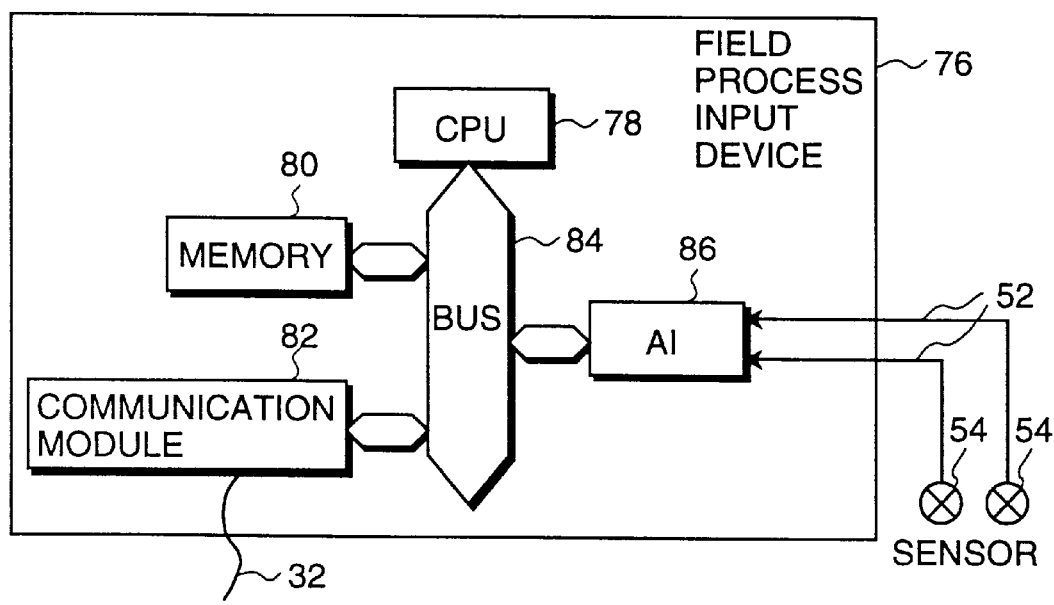
FIG. 4 is an essential block construction view showing a field process inputting device according to the present invention.

According to this embodiment of the present invention, as shown in FIG. 1 and FIG. 4, it is possible to provide a field process inputting means (circuit) 76 as a common controller to each of the switch gears 34. In a case of the provision of the above stated field process inputting means 76, it is possible to remove the analog inputting unit (AI) 42 from the apparatus construction.

The field process inputting means 76 comprises, as shown in FIG. 4, a CPU 78, a memory 80, a communication module 82, and an analog inputting unit (circuit) (AI) 86. The communication module 82 is connected to the communication module 38 of the switch gear 34 through the serial transmission cable 32 and the analog inputting unit (AI) 86 is connected to the plural sensors 54 through the process cable 52. This field process inputting means 76 input the condition relating to the auxiliaries to be operated which are obtained each of the plural sensors 54 through the analog inputting unit (AI) 86.

Under the basis of the inputted information the protection and the interlock information about the auxiliaries to be operated is generated, and this generated information is transmitted to the switch gear 34 through the communication module 34. In this case, by arranging the field process inputting device 76 nearly to the auxiliaries to be operated, it is possible to carry out the operation control and the monitor control at the side of the auxiliaries to be operated.

As stated in the above, in a case where the scale of the apparatus increases, the installation cost of each of the apparatus constructions does not arise and the long periods of time of the installation construction and the testing process cause scarcely.

Namely, since the controller is not installed in the central control room, it is unnecessary to wire the process cable wires extending over the long distance from the process apparatus to the central control room. Even the number of the inputting device and the outputting device which are accompanied with the large size of the plant scale and the high degree property of the control system of the apparatus increases, the installation cost of the apparatus arise scarcely.

Further, even the large scale of the control machine room which is accompanied with the large scale of the controller according to the high degree property of the control contents, the installation cost of the apparatus arises scarcely.

Further, since the command accompanying with the activating operation and the stopping operation of the process machine according to the operator is not outputted through the auxiliary sequence controller, there causes no problem in which the testing of the process machine can not carried out, only after the completion of the installation construction of a whole apparatus and the distribution panel and the connection construction of the process cable wires.

What is claimed is:

1. A distribution panel switch gear comprises:
   plural controlling means for controlling each of plural auxiliaries to be operated in response to a control command;
   plural condition inputting means for inputting respectively a signal in response to a condition of each of said plural auxiliaries to be operated;
   a monitor information generating means for generating monitor information which includes at least one side information in information relating to a protection and an interlock of each of said plural auxiliaries to be operated in accordance with an input of each of said plural condition inputting means; and
   a control command outputting means for outputting a control command to a specific controlling means among said plural controlling means in accordance with said monitor information relating to the protection and the interlock of each of said plural auxiliaries to be operated which is generated in said monitor information generating means and for operating the protection and the interlock of each of said plural auxiliaries to be operated.

2. A distribution panel switch gear according to claim 1, wherein
   each of said monitor information generating means and said control command outputting means is constructed with a redundant form.

3. A monitoring and control system having a distribution panel switch gear comprises:
   an operation and monitor command outputting means for outputting a command relating to an operation and a monitor of plural auxiliaries to be operated;
   plural controlling means for controlling each of said plural auxiliaries t be operated in response to a control command;
   plural condition inputting means for [inputting respectively a signal in response to a condition of each of said plural auxiliaries to be operated;
   a monitor information generating means for generating monitor information which includes at least one side information in an inputted information by carrying out a transfer of information between said operation and monitor command outputting means and information relating to a protection and an interlock of each of said plural auxiliaries to be operated in accordance with an input of each of said plural condition inputting means; and
   a control command outputting means for outputting a control command to a specific controlling means among said plural controlling means in accordance with said monitor information relating to the protection and the interlock of each of said plural auxiliaries to be operated which is generated in said monitor information generating means and for operating the protection and the interlock of each of said plural auxiliaries to be operated; wherein;
   said operation and monitor command outputting means and said distribution panel switch gear having said monitor information generating means are connected through a serial transmission system.

4. A monitoring and control system according to claim 3, wherein
   a serial transmission system for carrying out a transfer of information between said operation and monitor command outputting means and said distribution panel switch gear having said monitor information generating means are constructed with a redundant form.

5. A monitoring and control system according to claim 3, wherein
   a maintenance information inputting means for inputting to said monitor information generating means information relating to a maintenance in place of said command from said operation and monitor command outputting means.

6. A monitoring and control system according to claim 3, wherein
   an operation and monitor information inputting means for inputting to said monitor information generating means information relating to an operation and a monitor about each of said plural auxiliaries to be operated in place of said command from said operation and monitor command outputting means.

7. A monitoring and control system having a distribution panel switch gear comprises:
   an operation and monitor command outputting means for outputting a command relating to an operation and a monitor of plural auxiliaries to be operated;
   plural controlling means for controlling each of said plural auxiliaries to be operated in response to a control command;
   plural condition inputting means for inputting respectively a signal in response to a condition of each of said plural auxiliaries to be operated;
   a monitor information generating means for generating monitor information which includes at least one side information within an inputted information by carrying out a transfer of information between said operation and monitor command outputting means and information relating to a protection and an interlock of each of said plural auxiliaries to be operated in accordance with an input of each of said plural condition inputting means;

a control command outputting means for outputting a control command to a specific controlling means among said plural controlling means in accordance with said monitor information relating to the protection and the interlock of each of said plural auxiliaries to be operated which is generated in said monitor information generating means and for operating the protection and the interlock of each of said plural auxiliaries to be operated;

plural auxiliary condition inputting means for inputting respectively a signal in response to a condition of each of said plural auxiliaries to be operated; and an auxiliary operation and monitor command outputting means for outputting a command relating to an operation and a monitor of each of plural auxiliaries to be operated in accordance with an input of each of said plural auxiliary operation condition inputting means; wherein said operation and monitor command outputting means and said distribution panel switch gear having said monitor information generating means are connected through a serial transmission system, and said auxiliary operation and monitor command outputting means and said distribution panel switch gear having said monitor information generating means are connected through a serial transmission system.

* * * * *